(12) United States Patent
Chatelet et al.

(10) Patent No.: US 10,174,608 B2
(45) Date of Patent: Jan. 8, 2019

(54) INSTALLATION FOR INTERVENTION IN A WELL COMPRISING A NEUTRON GENERATOR, AND METHOD ASSOCIATED THEREWITH

(71) Applicant: Schlumberger Technology Corporation, Sugar Land, TX (US)

(72) Inventors: Vincent Chatelet, Roissy-en-France (FR); Axel Quignard, Paris (FR); Peter Wraight, Skillman, NJ (US); Jean-Pierre Poyet, Houston, TX (US); Fabien Nibodeau, Roissy-en-France (FR); Luke Perkins, Plainsboro, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 41 days.

(21) Appl. No.: 15/500,717

(22) PCT Filed: Jul. 31, 2015

(86) PCT No.: PCT/EP2015/001578
§ 371 (c)(1),
(2) Date: Jan. 31, 2017

(87) PCT Pub. No.: WO2016/029988
PCT Pub. Date: Mar. 3, 2016

(65) Prior Publication Data
US 2017/0226848 A1    Aug. 10, 2017

(30) Foreign Application Priority Data
Aug. 3, 2014  (EP) .................................... 14290226

(51) Int. Cl.
*E21B 47/12*    (2012.01)
*G01V 5/10*    (2006.01)

(52) U.S. Cl.
CPC .............. *E21B 47/122* (2013.01); *G01V 5/10* (2013.01)

(58) Field of Classification Search
CPC ................................ E21B 47/122; G01V 5/10
See application file for complete search history.

(56) References Cited

U.S. PATENT DOCUMENTS

| 3,662,179 A | 5/1972 | Frentrop et al. |
| 4,721,853 A | 1/1988 | Wraight |

(Continued)

FOREIGN PATENT DOCUMENTS

| WO | 2009070535 A1 | 6/2009 |
| WO | 2009088501 A1 | 7/2009 |

(Continued)

OTHER PUBLICATIONS

Extended Search Report issued in the related EP Application 142902261.1, dated Jun. 14, 2017 (8 pages).

(Continued)

*Primary Examiner* — Christine S Kim
(74) *Attorney, Agent, or Firm* — Michael Dae

(57) ABSTRACT

An installation for intervention in a well, comprises a lower assembly comprising a neutron generator and a power source electrically connected to the neutron generator; a surface assembly comprising one or more safety devices, each safety device being either in a safe state or an unsafe state; and a communication module that connects the lower and surface assemblies. The surface assembly also comprises a surface transmitting device for transmitting data to the downhole assembly via the communication module including a first transmitter for transmitting an activating (Continued)

command, where the first transmitter transmits the activating command only if each of the safety device is in a safe state, and a second transmitter for transmitting a stopping command, where the second transmitter transmits the stopping command if one of the safety device is in an unsafe state.

14 Claims, 6 Drawing Sheets

(56) References Cited

U.S. PATENT DOCUMENTS

| | | | |
|---|---|---|---|
| 5,293,410 A | | 3/1994 | Chen et al. |
| 5,812,068 A | * | 9/1998 | Wisler .................... E21B 7/068 |
| | | | 175/40 |
| 6,005,244 A | | 12/1999 | Vaeth et al. |
| 7,652,592 B2 | | 1/2010 | Le Briere et al. |
| 2002/0038849 A1 | | 4/2002 | Adolph et al. |
| 2003/0213595 A1 | | 11/2003 | Jackson |
| 2013/0118761 A1 | * | 5/2013 | Ludwig .................. H01H 35/32 |
| | | | 166/381 |
| 2013/0168081 A1 | | 7/2013 | Yang et al. |
| 2013/0175094 A1 | * | 7/2013 | Ross ........................ E21B 23/00 |
| | | | 175/57 |
| 2017/0114628 A1 | * | 4/2017 | Khalaj Amineh .. E21B 47/0006 |

FOREIGN PATENT DOCUMENTS

| | | |
|---|---|---|
| WO | 2013096487 A1 | 6/2013 |
| WO | 2013098280 A2 | 7/2013 |

OTHER PUBLICATIONS

Wahl et al., The Thermal Neotron Decay Time Log, SPE-2252, presented at SPE 43rd Annual Fall Meeting, held in Houston, TX, Sep. 29-Oct. 1968, revised manuscript received, Oct. 8, 1970 (15 pages).

International Search Report and Written Opinion issued in the related PCT application PCT/EP2015/001578, (12 pages).

* cited by examiner

INSTALLATION FOR INTERVENTION IN A WELL COMPRISING A NEUTRON GENERATOR, AND METHOD ASSOCIATED THEREWITH

FIELD

The present disclosure relates to a method and installation for intervention in a well and, more particularly, relates to the use of a neutron generator during an intervention in the well.

BACKGROUND

Intervention method and installation are generally performed with the help of mechanical tools such as jarring tool, release tool, or perforating tool, etc. To carry out these operations, these tools are lowered into the well by a stranded cable designed as slickline that is generally quite simple to operate, has good mechanical properties and does not get stuck into the well.

Neutron tools may comprise a neutron source, in particular a pulsed neutron generator, that is capable of generating neutrons and releasing the neutrons into a formation surrounding the well, and at least a detector for detecting gamma ray due to the interaction of the neutrons released by the generator with the formation. From the data acquired by the detector, parameters of the formation, such as density or lithology can be determined.

Such neutron tools are generally included into wireline tools in which they are powered from the surface but are not generally used during intervention in a well.

WO 2009/088501 discloses an intervention device comprising a neutron tool which is lowered into the well by a slickline. The neutron tool is powered by a power source situated in a lower assembly as power is not intended to be transferred through the slickline. However, such a system may pose safety issues because the tool is not powered from the surface and cannot be controlled as well as a wireline tool.

SUMMARY

According to one aspect of the disclosure, an installation for intervention in a well is provided. The installation comprises a lower assembly including a neutron generator and a power source electrically connected to the neutron generator. The installation also comprises a surface assembly including safety device(s), being either in a safe or in an unsafe state. The installation further includes a communication module connecting the lower and surface assemblies. The surface assembly only include a surface transmitting device that may comprise:
  a first transmitter for transmitting an activating command where the first transmitter transmits the activating command only if each of the safety devices is in a safe state, and
  a second transmitter for transmitting a stopping command, where the second transmitter transmits the stopping command if one of the safety devices is in an unsafe state.

It will be noted that by "only if each of the safety devices is in a safe state", Applicants mean that the activating command may be transmitted when predetermined conditions are met. These conditions include that each of the associated safety devices is in a safe state. Therefore, the detection of the safe state of each of the safety device may trigger the transmission of the activating command in one or more embodiments of the disclosure. But in other embodiments, other conditions along with the safe state of the safety devices may have to be met to trigger this transmission, and the activating command may not be transmitted even if each safety device is in a safe state.

By "if one of the safety devices is in an unsafe state", Applicants mean that the stopping command is sent if it is detected that one of the safety devices is in an unsafe state regardless of other conditions. Stopping command may be sent upon detection of the unsafe states of one of the safety devices.

The surface assembly may also comprise detection device(s), associated with the safety device(s) for determining whether the safety devices are in a safe state. The first transmitter may transmit the activating command only if the detection device(s) detect that each of the safety devices is in a safe state. The second transmitter may transmit the stopping command if if the detection device(s) detect that one of the safety devices is in an unsafe state.

More specifically, in one embodiment, the installation may, comprise a trigger interface for generating a triggering signal by the user. This trigger interface may comprise a shooting panel requiring activating several switches simultaneously or in a predetermined order by the operator. The first transmitter transmits the activating command only if the triggering signal has been generated. In this, embodiment, the activating command may be transmitted only if each safety device is in a safe state and when the user triggers the operation of the generator.

A safety device may include a measuring device of a parameter relative to the lower assembly. It may be in the safe state is the measured value of the parameter is above or below a predetermined threshold. The detection device may the compare a value of the parameter measured by the measuring device to the predetermined threshold value.

Parameter may be the depth of the lower assembly, the detection device determining that the safe state is reached when the measured depth is above a predetermined threshold value. The depth may be determined by measuring the length of a conveyance device of the lower assembly which has been deployed into the well.

A further safety device, which can be used alone or in combination with the one above-mentioned safety devices, may include a timer. The detection device associated with the safety device may compare the measured duration to a threshold duration, for instance 30 minutes. This timer may be launched automatically or by an operator when the tool is lowered into the well. The safety device may be in a safe state when the duration is above the threshold duration. The operation of the tool is therefore delayed by the timer and cannot be operated unintentionally when the tool has just been lowered into the well.

Another safety device, which can be used alone or in combination with the one above-mentioned safety device, may include an identification device, for identifying an authorized user. The detection device associated with the safety device may be an authentication device of the identification device. The identification device can include a mechanical or virtual key. The virtual key may be a certificate stored on a USB device for instance and/or a password provided by the user.

All of these safety devices have to be in a safe state before the neutron generator can be operated. The neutron generator is then controlled from the surface and operated safely even if it is powered in the lower assembly.

The lower assembly may comprise a downhole transmitting device for transmitting data relative to the lower assembly to the surface via the communication module. The state of the components of the lower assembly may be checked and in particular for determining if the neutron generator is indeed disabled before getting the lower assembly out of the well. Downhole transmitting device may also send data related to other components of the downhole tool, such as the power source (for instance, life indicator), other sensors, etc.

The operating assembly may comprise one or several detectors for detecting neutron and/or gamma ray released when the neutrons emitted by the neutron generator interact with a formation surrounding the well as well as the nearby material comprising the tool. The downhole transmitting device may be configured to transmit data acquired by the detector to the surface via the communication module. Data acquired by the detector may be obtained in real-time. It may help determining the position of the lower assembly in the well and/or the state of the well and consequently increasing the efficiency of the operation performed with the lower assembly.

The lower assembly may include a memory, such as a volatile or non-volatile memory, in which the acquired data are stored and retrieved when the lower assembly is carried to the surface. In one or several embodiments, the lower assembly may include the memory in addition to the downhole transmitting device, in which case it may serve as a back-up memory, storing the total amount of acquired data or data acquired when downhole transmitting device was unable to transmit to the surface. In other embodiments, the lower assembly may include the memory and no downhole transmitting device.

The lower assembly may also comprise an operating assembly including the neutron generator and the power source, and a control module configured to operably command component(s) of the operating assembly.

The control module may comprise:
  an actuating transmitter for sending an actuating signal to a component, sending the actuating signal only if the activating command has been received, and/or
  a blocking transmitter for sending a blocking signal to a component upon reception of the stopping command.

In some embodiments, the actuating transmitter may send the actuating signal upon reception of the activating command. In other embodiments the actuating transmitter may send the actuating signal if the activating command has been received and if other conditions are met.

The control module may comprise a receiver for receiving a component status signal from a component of the operating assembly. It may comprise a comparator for comparing the status of the component with a predetermined status and/or measuring the duration since the reception of former component status signal has been received, and for comparing the duration with a threshold duration. The blocking signal may also be emitted by the control module in function of one of the comparisons. The component may be the neutron generator. If the status of the component does not correspond to a predetermined status or if a OK status has not been received during a predetermined duration, the control module turns the component off or prevents the component from operating.

The control module may comprise a detector for measuring a parameter relative to power in the lower assembly (for instance voltage or current) and for comparing the value of the parameter to a threshold value. The actuating transmitter and/or the blocking transmitter may send respectively the actuating or blocking signal in function of the result of the comparison. The neutron generator is therefore operated if the monitored components of the operating assembly function as planned. The measured parameters may be:
  an output voltage or current provided by the power source, and/or
  an input voltage or current provided for powering the generator.

The installation may comprise a conveyance device for conveying the lower assembly. The conveyance device may carry all or part of the communication module, which is electrically or optically connected to the lower assembly, in particular to the control module, and to the surface assembly, in particular to the surface transmitting device.

In some embodiments, the conveyance device comprises an electrically conductive conveying cable that may be referred to as "slickline". The cable may also be electrically connected to the lower and surface assemblies so as to be part of the communication module. In some embodiments, the cable may be as disclosed in U.S. Pat. No. 7,652,592 hereby incorporated by reference and/or as disclosed in application No WO2013/098280 also hereby incorporated by reference.

The conveying cable may have a smooth outer surface, and comprise a solid metal core and an electrically insulating sheath defining the smooth outer surface of the cable. The core may have a breaking strength of more than 300 daN and an electrical linear resistance of more than 30 mohms/m. The activating and stopping commands may be transmitted via the cable. Data from the lower assembly to the surface assembly may be transmitted through the cable or through a casing of the well as explained in the above-mentioned documents.

In other embodiments, the conveyance device may comprise a conveying tube attached to an optical fiber optically connected to the lower and surface assemblies and being part of the communication module. The tube may be referred to as "coiled tubing". The optical fiber may be attached to the inner or outer face of the tube.

The first transmitter situated at the surface side may transmit a first activating command and a second activating command to the lower assembly, especially the control module. The lower assembly may comprise a timer for measuring the duration since the reception of the first activating command and for comparing the duration with a threshold duration, and the actuating transmitter may send the actuating signal only if the second activating command has been received before the threshold duration. The activating command may also be encrypted at the surface and decrypted in the lower assembly thanks to known encryption method.

The control module may comprise a programmable logic control circuit, advantageously of the FPGA type, capable of passing from an initial state to a first state upon reception of the first activating command and then on a second state upon reception of the second activating command, the transition to the second state being only possible after the transition to the first state.

The surface transmitting device may transmit periodically a surface confirmation command to the lower assembly, in particular to the control module after an activating command has been transmitted. The control module may comprise a timer for measuring the duration since the former surface confirmation signal or the activating command has been received and for comparing the duration with a threshold duration. Surface confirmation command may be the same as activation command. The blocking transmitter may send the blocking signal when the compared duration is above the threshold. When the communication with the surface is interrupted, for instance because the communication module is damaged, the neutron generator does not continue to operate.

The lower assembly may include one or several mechanical switches positioned in series between the power source and the neutron generator, the mechanical switch being capable of closing spontaneously to enable current to flow, when the temperature and/or the pressure applied on the switch are greater than a determined temperature and/or determined pressure. Thus, power is provided to the neutron generator in the well where temperature and/or pressure are greater than at the surface. The neutron generator cannot be operated when situated out of the well, below pressure and/or temperature thresholds, even intentionally.

The lower assembly may include a timer and a switch associated to the timer, the mechanical switch being capable of closing spontaneously to enable current to flow, when the duration measured by the timer is greater than threshold duration, for instance 30 minutes.

According to another aspect of the disclosure, a method for intervention in a well is provided. This method comprises using a lower assembly intended to be lowered into a well and including a neutron generator and a power source electrically connected to the neutron generator, detecting a state of safety device(s) of a surface assembly, the safety device(s) being either in a safe state or in a unsafe state, transmitting to the lower assembly an activating command only if each of the safety device is in a safe state, and transmitting to the lower assembly a stopping command, if one of the safety device is in an unsafe state.

The method may include:

operating the neutron generator by the control module only if the activating command has been received by the control module, and stopping the operation of the neutron generator upon reception of the stopping command by the control module.

In some embodiments, detecting the state of a safety device may include:

the safety device being a measuring device, comparing a value of a parameter measured by the measuring device to a predetermined threshold; and/or the safety device being an identification device for identifying an authorized user, authenticating the identification device.

BRIEF DESCRIPTION OF THE DRAWINGS

The disclosure will be better understood upon reading the description which follows, only given as an example and made with reference to the appended drawings, wherein.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
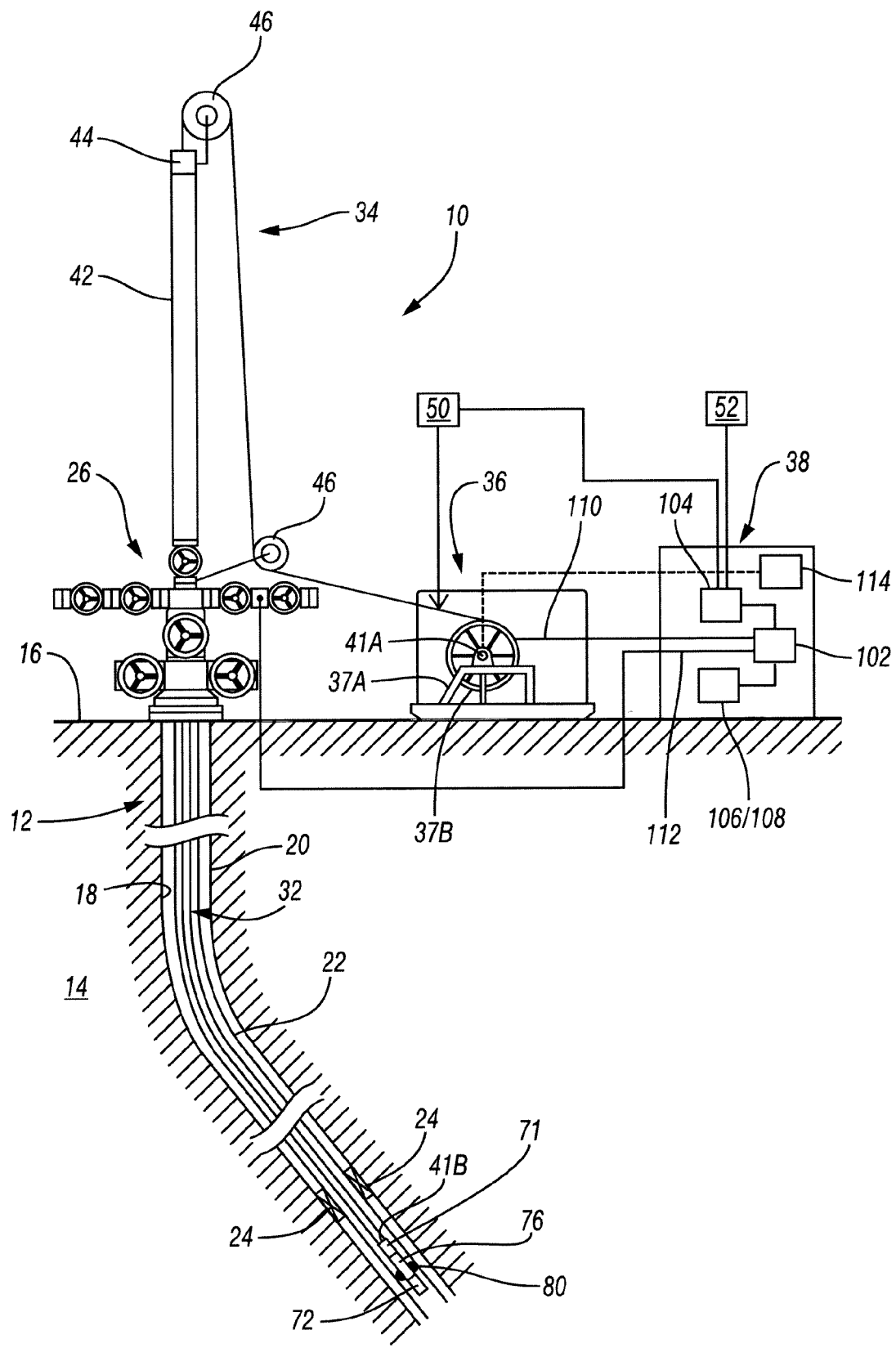
FIG. 1 is a general schematic view of an intervention installation according to one embodiment of the disclosure.

An intervention installation 10 according to the disclosure is illustrated in FIG. 1. This installation 10 is intended to perform operations in a fluid production or injection well 12 made in the subsoil 14.

These operations are applied by means of a lower assembly for carrying out actions and/or perform measurements at the bottom of the well 12, such as perforations, cuttings by means of a torch, cementation operations, jarring operations or further operations for setting tools into place such as setting into place a seal gasket or anchoring of a tool.

These interventions are carried out in any point of the well 12, from the surface 16.

The fluid produced in the well 12 is for example a hydrocarbon such as petroleum or natural gas and/or another effluent, such as steam or water. for instance if the well is an "injector" well into which liquid or gas is injected.

The well 12 is made in a cavity 18 positioned between the surface 16 of the ground and the fluid layer to be exploited (not shown) located in depth in a formation of the subsoil 14.

The well 12 generally includes an outer tubular duct 20, designated by the term of "casing", and formed for example by an assembly of tubes applied against the formations of the subsoil 14. Advantageously, the well 12 includes at least one inner tubular duct 22 with a smaller diameter mounted in the outer tubular duct 20. In certain cases, the well 12 is without any duct 20, 22.

The inner tubular duct 22 is generally designated as "production tubing". It is advantageously formed with a metal assembly of metal tubes. It is wedged inside the outer tubular duct 20 for example by linings 24.

The well 12 includes a well head 26 at the surface which selectively closes the outer tubular duct 20 and said or each inner tubular duct 22. The well head 26 includes a plurality of selective access valves inside the outer tubular duct 20 and inside the inner tubular duct 22.

The intervention installation 10 includes an intervention device comprising an intervention and measurement lower assembly 30 intended to be lowered into the well 12 through the inner tubular duct 22, and a conveying cable 32 for deploying the lower assembly 30 in the well 12. The lower assembly will be described in more details with reference to FIG. 2.

The intervention installation 10 further includes a sealing and alignment assembly 34 of the cable 32, mounted on the well head 26, an assembly 36 for deploying the cable 32, positioned in the vicinity of the well head 26, and a surface control unit 38, which will be described in more details in reference to FIG. 3.

The sealing and alignment assembly 34 comprises an airlock 42 mounted on the well head 26, a stuffing box 44 for achieving the seal around the cable 32 and return pulleys 46 respectively attached on the stuffing box 44 and on the well head 26 in order to send back the cable 32 towards the deployment assembly 36.

The airlock 42 is intended to allow introduction of the lower assembly 30 into the well 12.

The stuffing box 44 is capable of achieving a seal around the smooth outer surface of the cable 32, for example via annular linings applied around this surface or/and by injecting a fluid between the outer surface and the wall of the stuffing box 44.

In a so-called "open well" or "open hole" alternative, in which there is no casing 20, the assembly 34 is exclusively an assembly for aligning the cable, without any sealing device.

The deployment assembly 36 includes a winch 37A provided with a winder 37B. The winch 37A and its winder 37B are laid on the ground or are optionally loaded onboard a vehicle (not shown). The winch 37A is capable of winding or unwinding a given length of cable 32 for controlling the displacement of the lower assembly 30 in the well 12 when moving up or down respectively. An upper end 41A of the cable is attached onto the winder 37B.

The surface control unit is connected to at least a safety device 50, 52, and more particularly on the embodiment shown on FIG. 1, to two different safety devices 50 and 52. The number of safety devices can be more or less than two.

In the embodiment of FIG. 1, the first safety device 50 is a measuring device for measuring the length of the slickline cable that has been unwound from the winch 37A and deployed in the well and therefore the approximate depth of the lower assembly. This measuring device is a sensor that is known in the art, such as an optical, mechanical or electrical sensor. It may for instance count the number of turns that have been performed by the winch 37A for deploying the cable into the well.

The second safety device 52 is an identification device for identifying an user that is operating the surface control unit 38. This identification device is a computer in which a USB key containing a password may be inserted. The identification device may be of any type, such as a RFID, or barcode reader in front of which the user may present a corresponding device, a lock in which the user should insert the a mechanical key, a biometric reader, and/or an user interface in which the user enters a password or insert a USB key on which a certificate is stored.

Figure 2:
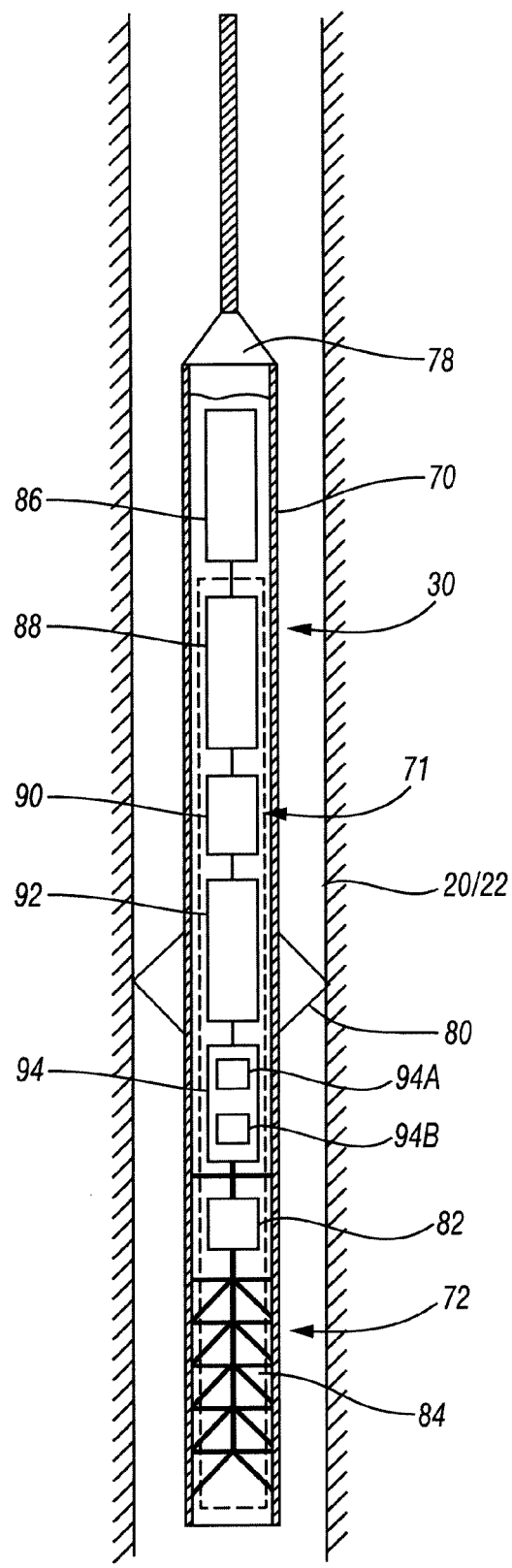
FIG. 2 is a schematic view of a lower assembly of the intervention installation of FIG. 1.

As illustrated by FIG. 2, the cable 32 is a cylindrical solid cable having a smooth outer surface 40.

The cable 32 extends between an upper end 41A, attached on the deployment assembly 36 at the surface, and a lower end 41B, intended to be introduced into the well 12. The lower assembly 30 is suspended from the lower end 41B of the cable 32.

The length of the cable 32, taken between the ends 41A, 41B is greater than 1,000 m and is notably greater than 1,000 m and comprised between 1,000 m and 10,000 m.

The cable 32 has an outer diameter of less than 8 mm, advantageously less than 6 mm.

The cable 32 includes a central metal core, and an insulating outer sheath applied around the central core.

The central core is formed by a single strand of solid metal cable, designated by the term "piano wire" and sometimes by the term of "slickline cable".

The metal material forming the core is for example electroplated or stainless steel. This steel for example comprises the following components in mass percentages:

Carbon: between 0.010% and 0.100%, advantageously equal to 0.050%;
Chromium: between 10% and 30%, advantageously equal to 15%;
Manganese: between 0.5% and 3%, advantageously equal to 1.50%;
Molybdenum: between 1.50% and 4%, advantageously equal to 2%;
Nickel: between 5% and 20%, advantageously equal to 10%;
Phosphorus: less than 0.1%, advantageously less than 0.050%;
Silicon: less than 1% advantageously less than 0.8%;
Sulphur: less than 0.05% advantageously less than 0.03%;
Nitrogen less than 1%, advantageously less than 0.5%.

This steel is for example of the 5R60 type.

The core is solid and homogeneous over the whole of its thickness. It has a smooth outer surface.

The diameter of the core is typically comprised between 1 mm and 5 mm, advantageously between 2 mm and 4 mm, and is for example equal to 3.17 mm, i.e. 0.125 inches.

The core has a breaking strength of more than 300 daN, and notably comprised between 300 daN and 3,000 daN, advantageously between 600 daN and 2,000 daN.

The core further has a relatively high electrical linear resistance of more than 30 mohms/m, and for example comprised between 50 mohms/m and 150 mohms/m.

The core has sufficient flexibility so as to be wound without any substantial plastic deformation on a drum with a diameter of less than 0.8 m.

The outer sheath forms an annular sleeve applied on the core, over the whole periphery of the core, on substantially the whole length of the cable 32, for example on a length of more than 90% of the length of the cable 32, taken between its ends 41A, 41B.

The outer sheath thus has a cylindrical inner surface applied against the central core and a smooth outer surface delimiting the smooth outer surface of the cable 32.

The thickness of the sheath is advantageously comprised between 0.2 mm and 2 mm.

The outer sheath includes a polymer matrix.

The matrix is made on the basis of a polymer such as a fluoropolymer of the fluorinated ethylene propylene type (FEP), perfluoroalkoxyalkane, polytetrafluoroethylene (PTFE), perfluoromethylvinylether, or on the basis of a polyketone such as polyetheretherketone (PEEK) or polyetherketone (PEK), or on the basis of epoxy, optionally taken as a mixture with a fluoropolymer, or further based on polyphenylene sulfite polymer (PPS), or mixtures thereof.

Advantageously, the polymer matrix is made in polyetheretherketone (PEEK).

The outer sheath optionally comprises mechanical reinforcement fibres embedded in the polymer matrix.

As illustrated by FIG. 2, the lower assembly 30 comprises a hollow case 70 comprising an operating assembly 71 comprising one or several measuring module and tools such as jarring tools or perforating tool, capable of being controlled from the surface by electrical signals transmitted through the cable 32. In one embodiment shown on FIG. 2, this tool is a perforating system 72, comprising a detonator 82 and at least one explosive charge 84 but such a tool is optional or may be replaced by another tool. Other tools can also be added.

One of the measuring modules is a neutron tool 94 comprising at least a neutron generator 94A for generating neutrons scattering through the surrounding formation, such as a Deuterium-tritium neutron generator producing 14 MeV isotropically-emitted neutrons, and a detector 94B for detecting neutron and/or gamma-rays induced by the interaction of the neutrons generated by the neutron generator with the formation. Any neutron tool is likely to be used with the device according to the disclosure. Examples of neutron tools are described in U.S. Pat. No. 5,293,410; Patent Publication No. EP2215898, the entire contents of which are incorporated by reference into the current application. Other examples of neutron tools are also suitable for use in the lower assembly device according to the disclosure. Other measuring modules and tools can be included into the lower assembly according to the disclosure.

The case 70 is of a generally tubular shape. It is connected to the cable 32 through a mechanical and electrical connecting head 78. The case 70 advantageously includes a plurality of centralizers 80 protruding radially so as to be applied onto the wall of the duct 20, 22 and to achieve electrical contact with this wall. Other tools can also be used to achieve electrical contact with the wall of the tubing, such as magnets.

According to the disclosure, the operating assembly 71 includes a communications and control module 86, and the operating assembly comprises a power battery 88 and an electrical power generator 92.

The operating assembly 71 further includes an upstream safety module 90 interposed between the power battery 88 and the generator 92, the upstream module 90 including a fuse in this example, even if the upstream module is not limited to this architecture. It may also include downstream safety modules interposed between the power generator and/or the neutron tool and/or the perforating tool 72 but such a downstream module is not featured in this embodiment.

Figure 3:
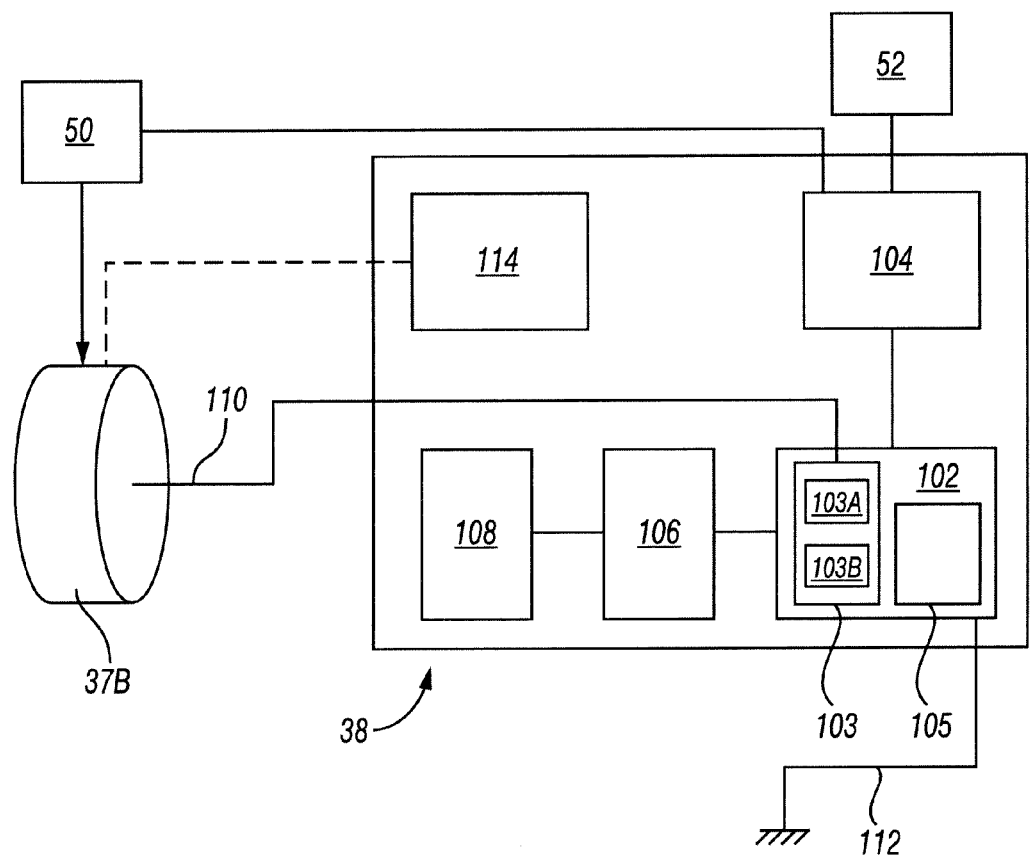
FIG. 3 is a schematic diagram of a surface control unit of the intervention installation of FIG. 1.

In reference to FIG. 3 we will now describe in more details the surface control unit 38.

As illustrated by FIG. 3, the surface control unit 38 includes a surface transceiver 102, a safety detection module 104, a control interface 106 and a triggering panel 108. The control unit 38 further includes a module 114 for controlling the winch 37A and winder 37B.

The surface transceiver 102 is electrically connected downstream to the core of the cable 32 via a first electrical surface path 110. It is electrically connected downstream to the well head 26 and to the ducts 20, 22 via a second electrical surface path 112. The transceiver comprises a surface transmitter 103 for transmitting data downhole and a surface receiver 105 for receiving data coming from downhole. It is therefore capable of transmitting and receiving various electrical signals on a current loop defined by the first electrical path 110, the cable 32, the lower assembly 30, the ducts 20, 22, the well head 26, and the second electrical surface path 112. Path 110, cable 32, ducts 20, 22, well head 26 are part of a communication module for transmitting data uphole to downhole or downhole to uphole. This communication module provides real-time communication between the surface and the lower assembly.

The control unit further includes a safety detection device or module 104 which is connected to each of the safety devices 50, 52. This detection module is also connected to the surface transceiver 102. It receives data from the safety modules 50, 52 and determines thanks to these data if the safety modules are in a safe or an unsafe state. This detection module may compare a value measured by the safety device 50 with a threshold value and a password provided by the user on safety device 52 to a stored password. It can also acknowledge the presence of an identification device at a predetermined location in safety device 52 by optical or electrical detection (for instance, when the identification device is a key, able to activate a switch).

The control unit further includes an interface 106 also connected to the surface transceiver 102. The interface 106 advantageously comprises a keyboard, a display screen and a central processing unit such as for example a computer. The triggering panel 108 includes a mechanical button or any other mean for triggering the operation of the neutron tool. It may also comprise a power-on indicator lamp. The triggering panel is also connected to the surface transceiver (in this embodiment, via the user interface). It can also be noted that the safety device 52, triggering panel 108 and user interface 106 can be one sole device.

The surface transceiver 102 comprises a first transmitter 103A for sending an activating command to the lower assembly and a second transmitter 103B for sending a stopping command. These first and second transmitters operate in function of the data received from the detection device 104 and triggering panel 108 as will be explained below.

The control unit itself can be a computer device comprising a storage medium storing computer programs comprising machine-readable instructions and a processor for executing these programs, enabling to operate detection and surface transceiver 102.

Figure 4:
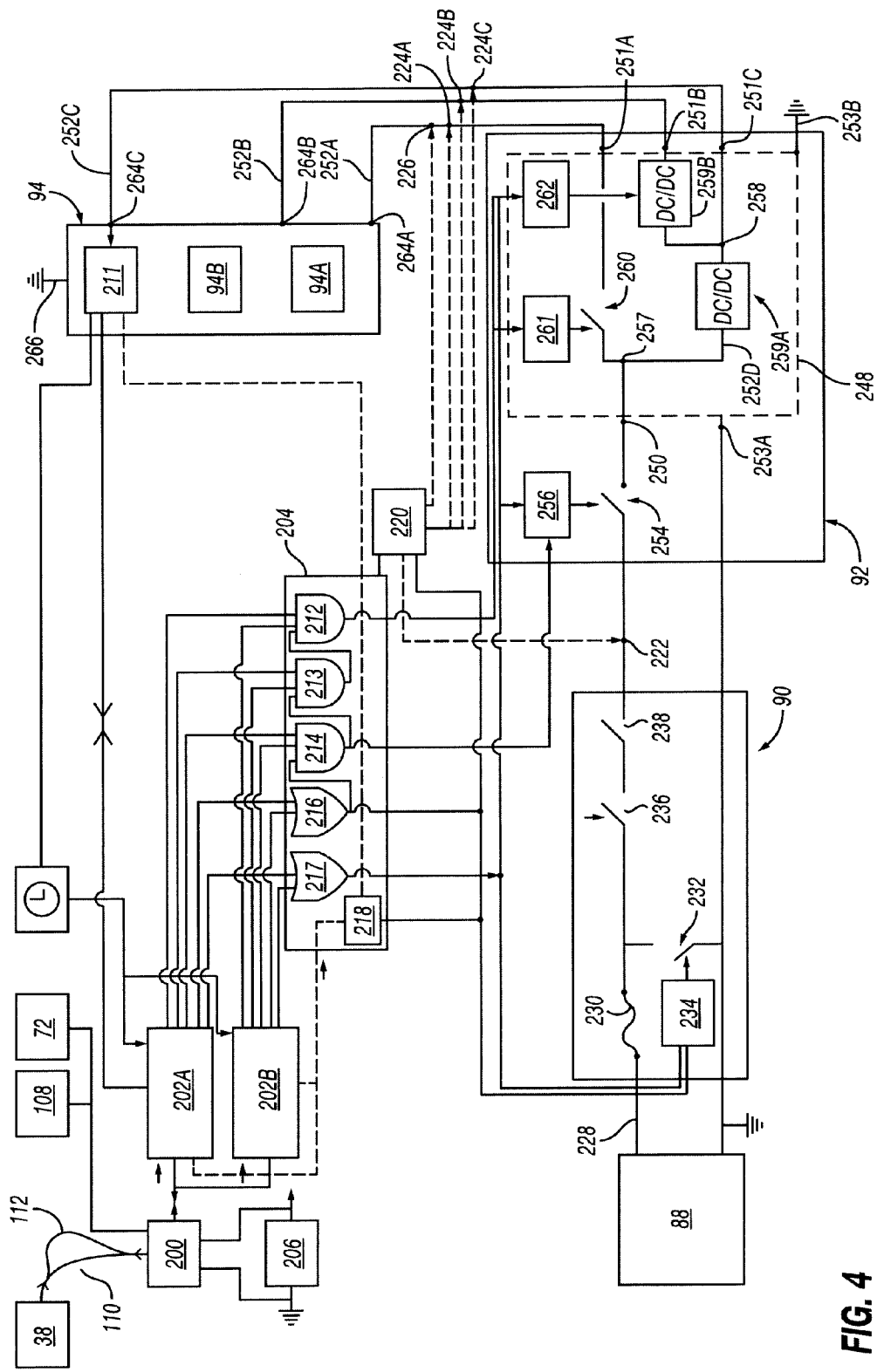
FIG. 4 is a schematic view of an electrical circuit of the lower assembly of FIG. 2, FIGS. 5 and 6 are diagrams representing each a different phases of a method according to one embodiment of the disclosure.

As illustrated by FIG. 4, the communications and control module 86 in this example includes a downhole transceiver device or unit 200 for communicating with the control unit 38 via the current loop including the conveying cable 32, the ducts 20, 22 and the electrical paths 110, 112.

The module 86 further includes two microcontrollers 202A and 202B, and a programmable logic circuit 204, advantageously of the FPGA type, electrically connected upstream to the microcontrollers 202A, 202B and downstream to the power generator 92. The use of two microcontrollers is for redundancy but the module 86 may include only one microcontroller.

The module also comprises an auxiliary battery 206 electrically connected to the downhole transceiver unit 200 in order to electrically power this unit 200. Further it is capable of electrically powering the microcontrollers 202A, 202B and the programmable logic circuit 204. The voltage generated by the auxiliary battery 206 is greater than 1.5 volts and is less than 7.5 volts. This voltage is advantageously comprised between 2 volts and 6 volts.

Thus, the whole electrical power for operating the communications and control module 86 is provided in a self-contained way by the auxiliary battery 206.

The downhole transceiver unit 200 is electrically connected to the core 48 of the cable. It includes at least one transceiver capable of receiving electrical communications signals transmitted from the control unit 38 at the surface through the cable 32 through the electrical path 110 and the cable 32 and of transmitting electrical communication signals towards the control unit 38 through the cable 112 and the casing 20.

The downhole transceiver unit 200 further comprises transmits the electrical communication signals received from the surface to the microcontrollers 202A, 202B, and then to the programmable logic circuit 204 in order to trigger the operation or stop of the neutron generator, directly or indirectly.

The communication and control module 86 may be further electrically connected to measurement sensors 208. The sensors 208 are for example sensors for detecting a physical quantity such as temperature, pressure, flow rate, depth, status of a depth valve, natural radiation of the ground (gamma rays), localisation of the tubing gaskets ("casing collar locator") or other measuring sensors.

The downhole transceiver unit 200 is capable of collecting electric signals transmitted by the sensors 208 and of transferring them towards the control unit 38 at the surface through the cable 32. It can also be connected to tools such as the perforating tool 72 in order to operate the tool from the surface. These features will however not be described in more details here.

The microcontrollers 202A, 202B are connected to the downhole transceiver 200 in order to receive the electrical commands, such as activating or stopping commands transmitted from the surface unit 38. It is capable of decoding and of transmitting the commands it receives respectively towards the programmable logic circuit 104.

Each microcontroller 202A, 202B is connected to a clock 210 as well as the logic circuit 204. The microcontrollers 202A, 202B are capable of transmitting at regular intervals, a signal for confirming reception of the periodic pulses generated by the clock 110.

A microcontroller 211 of the neutron tool 94 is also connected to the clock 210. This microcontroller 211 is also connected with one of the microcontrollers (here, 202A) in order to communicate with the surface control unit 38 via transceivers 102; 200 and communication module comprising the cable 32. Data acquired by the tool and in particular by the detector 94B can therefore be transmitted to the surface. One of the microcontroller 211, 202A may also include a memory, such as a non-volatile memory, to store data acquired by the tool 94.

The circuit 204 has several logic gates: three logic gates 212, 213, 214 of the "AND" type, and two logic gates 216, 217 of the "OR" type. Gates 212, 214 are intended to be connected at the power generator 92 as will be seen below, and gate 217 is intended to be connected to the upstream safety module 90, as this will be seen below. Gate 216 is intended at being connected both at the upstream safety module 90 and at the power generator 92. Each of the logic gates 212, 214, 216 is electrically connected to the first microcontroller 202A and to the second microcontroller 202B through electrical and disjoint logic paths The programmable logic circuit 204 further has a synchronisation system 218 and a state detection component 220 which will be described in detail below.

The synchronization system 218 is of the watchdog type.

This system 218 is electrically connected to each of the microcontrollers 202A, 202B in order to receive the pulses transmitted by the microcontrollers 202A, 202B, respectively in response to the signals transmitted by the clock 210.

The system 218 is capable of producing a blocking signal if one of the microcontrollers 202A, 202B no longer transmits a synchronisation pulse, or if the clock of the microcontrollers is no longer operating.

As this will be seen below, the detection component 220 includes a first sensor 222 for indicating an applied voltage at the input of the power generator 92 by the power battery 88, a second sensor 224 for indicating a voltage transmitted at the output of the power generator 92 and a third sensor 226 for indicating a current flowing between the power generator 92 and the neutron tool 94. When the neutron tool is powered by several power lines having several voltages, each of these voltages can also be monitored by the second sensor 224 (224A, 224B, 224C). Each of the sensors is able to determine if the detected voltage is superior and/or inferior to predetermined threshold values.

The power battery 88 is capable of delivering an electrical voltage of more than 40 volts and an intensity of more than 0.5 ampere. It thus has a rated power of more than 20 watts.

The battery 88 for example comprises a plurality of electrical voltage sources mounted in series and/or in parallel, received in a case. It optionally comprises an internal fuse received in the case.

The battery 88 comprises a first terminal electrically connected to the power generator 92 via an upstream electrical line 228 through the upstream safety module 90. It comprises a second terminal electrically connected to the electrical ground of the system, advantageously the chassis of the lower assembly or the frame of the tool.

The upstream safety module 90 includes a fuse 230, a switch 232, for triggering the opening of the fuse 230 and a blocking control unit 234 for controlling the switch 232.

The fuse 230 is mounted in series on the upstream electrical line 228, outside the case of the battery 88. It is removeably mounted on this line 228 so as to be able to be replaced after its opening.

The fuse 230 is for example formed by a calibrated meltable metal wire. The fuse 230 is capable of being opened when the intensity of the electric current flowing on the line 228 is greater than a determined rated intensity.

The switch 232 connects an output of the fuse 230 located on the line 228 to the electrical ground. It is capable of being controlled between an open configuration and a closed configuration in which a short circuit is achieved between the power battery 88, the fuse 230, a low value resistor (not shown), the switch 232 and the electrical ground. In the closed configuration of the switch 232, the intensity of the electric current flowing in the fuse 230 is greater than the rated intensity for opening this fuse 230, which causes its opening.

The blocking control unit 234 is for example formed by an optocoupler or by a transistor.

It is electrically connected to the logic circuit 104 and more particularly to gates 216, 217. It is able to cause toggling of the switch 232 from an open configuration to a closed configuration or from a closed configuration to an open configuration upon reception of a signal from one of the gates 216, 217.

In an alternative which is not shown on the drawings, the safety module may comprise a switch in the electrical line 228 and a blocking control unit commanding the switch instead of the fuse 230, switch 232 and blocking control unit 234.

The upstream safety module 90 also includes a first mechanical switch 236 controllable by pressure and a second mechanical switch 238 controllable by temperature. This mechanical switch could be positioned elsewhere in the lower assembly, for instance between the power generator 92 and the neutron tool 94. More safety switches may be included between the battery 88 and the neutron tool 94 for redundancy or for checking other conditions relative to the surroundings of the neutron tools.

The switches 236, 238 are mounted in series downstream from the fuse 230, and upstream from the power generator 92. The switch 236 is capable of toggling in a self-contained way between an open configuration and a closed configuration when the pressure exerted on the switch 236 is greater than a threshold pressure. The switch 238 is capable of spontaneously toggling from an open configuration to a closed configuration, when the temperature applied on the switch 238 is above a threshold temperature.

The power generator 92 includes a power module 248 having a first input 250 intended to be connected to the power battery 88 through the upstream line 228 connected to several first outputs 251A, 251B, 251C intended to be connected to the neutron tool 94 through a respective downstream line 252A, 252B, 252C. Different parts of the neutron tool 94 may indeed be powered with different voltage.

The power module 248 further includes a second input 253A and a second output 253B connected to electrical ground.

The power generator 92 further includes upstream an upstream switch 254 mounted on the upstream line 228 downstream from the fuse 230. The upstream switch 254 is mounted between the upstream safety module 90 and the power module 248. It is connected to an initiation control unit 256 for example formed by an optocoupler or by a transistor. The control unit 258 is electrically connected to the logic circuit 204 and more particularly to gates 214, 216. It is able to cause toggling of the switch 256 from an open configuration to a closed configuration or from a closed configuration to an open configuration upon reception of a signal from one of the gates 212, 216.

The power converter has three output lines 252A, 252B, 252C obtained from one input line 228 in order to power the neutron tool 94 with three different voltages. The electrical circuit therefore comprises a first node 257 wherein upstream line 228 is separated in two downstream lines 252A, 252D and then a second node 258 wherein upstream line 252D is separated in two downstream lines 252B, 252C.

The power module 248 comprises two voltage converter 259A, 259B for example formed by a Switched Mode Power Supply or designated as SMPS.

These converters are capable of decreasing and/or increasing an input voltage received from the power battery 88 between its inputs 251A and 253A via the upstream line 228 in order to provide at the outputs on the downstream lines 252, a different voltage between its outputs 251B, 253B or 251C, 253B. Thus, the module 248 for example comprises a converter of the flyback type, of the boost type, or of the forward type. In the embodiment which is described here, the two converters are in series, the first one 259A being able to decrease the voltage provided by the battery so that the voltage reaching the neutron tool by output 252C is about 5V. This converter is situated in line 252D. The second converter is able to increase the voltage provided by the battery and the first converter 259A so that the voltage reaching the neutron tool by output 252B is about 10V. This converter is situated in line 252B. Of course, the voltages for operating the neutron tools may not be the same as described here, there may be more or less different power lines operated at different voltages, and the converters may be arranged in any appropriate way to obtain the voltages corresponding to the neutron tool specifications.

Line 252A of the power module 248 comprises a switch 260 for instance a transistor capable of being controlled by an actuating control unit 261. The actuating control unit 261 is for example formed by an optocoupler or a transistor as described earlier. It is electrically connected to the logic circuit 204, and more particularly to gates 212, 216. It is able to cause toggling of the switch 260 from an open configuration to a closed configuration or from a closed configuration to an open configuration upon reception of a signal from one of the gates 212, 216.

The second voltage converter 259B is also connected to an actuating control unit 262, connected to the logic gates 212, 216. It is capable of being controlled between an inactive state in which its output voltage is less than its input voltage, and an active state with an increase in voltage, or between the active state and the inactive state, by the actuating control unit 262.

Each of the output lines 252A, 252B, 252C may also comprise a switch which is a threshold switch. It is capable of passing from its open configuration to a closed configuration when the voltage at the output of the converter 248, taken between its outputs 251A, 253B, respectively 251B, 253B or 251C, 253B is greater than a predetermined threshold value, for example greater than 80% of the output voltage for electrically powering the neutron tool. Such a switch is not show on the drawings.

Each of the downstream lines 252A, 252B, 252C is electrically connected downstream from the power generator 92 to a respective inputs 264A, 264B, 264C of the neutron tool 94. A fourth input 266 of the neutron tool 94 is connected to the electrical ground. Line 252C powers the microcontroller 211 of the tool via input 264C of the tool.

A method 300 for operating the tool according to an embodiment will then be disclosed.

To operate the neutron tool from the surface, a initiation command is sent by the transceiver 103A to the control module 86 of the lower assembly 30 through the cable 32. This initiation command may be sent after the user has triggered it thanks to the triggering panel.

The control module 86 will then receive the initiation command. The transceiver unit 200 receives and detects the initiation command and separately transmits initiating signals towards the first microcontroller 202A and towards the second microcontroller 202B.

Each microcontroller 202A, 202B then decodes the initiating signals and separately transmits it to the logic gate 214 of the circuit 204. The circuit then toggles to a "Stand-By State".

Upon receiving both initiating signals from both microprocessors 202A, 202B, the logic gate 214 transmits initiating control signal in order to actuate the control unit 256 and to close the switch 254. The line 252C is then powered and a microcontroller 211 of the neutron tool is powered thanks to this line. The microcontroller 211 of the tool is then able to communicate with the surface control unit 38.

Of course, the power cannot reach the power generator and the neutron tool if the mechanical switches 236, 238 are closed.

After the initiation command has been sent, the synchronization unit 218 checks that at least the neutron tool microcontroller 211 and optionally also the microcontrollers 202A, 202B send pulses at predetermined time intervals. It compares the duration since the last pulse was received with a predetermined duration. If it is longer, the circuit toggles from the "Stand By state" to an "Error State". The synchronization unit also sends a blocking signal to the blocking control module 234 that triggers closing the switch and the opening of the fuse 230. The logic circuit also communicates with the transceiver unit 200 to inform the user at the surface that the control module 86 is in an "Error State". At this stage, even if the generator 94A of the tool is not turned on, the tool 94 is able to communicate with the surface control unit 38 via microcontroller 202 and transceiver module 200.

Then, when the control module 86 is in the "Stand By" state, the tool may be turned on.

Figure 5:
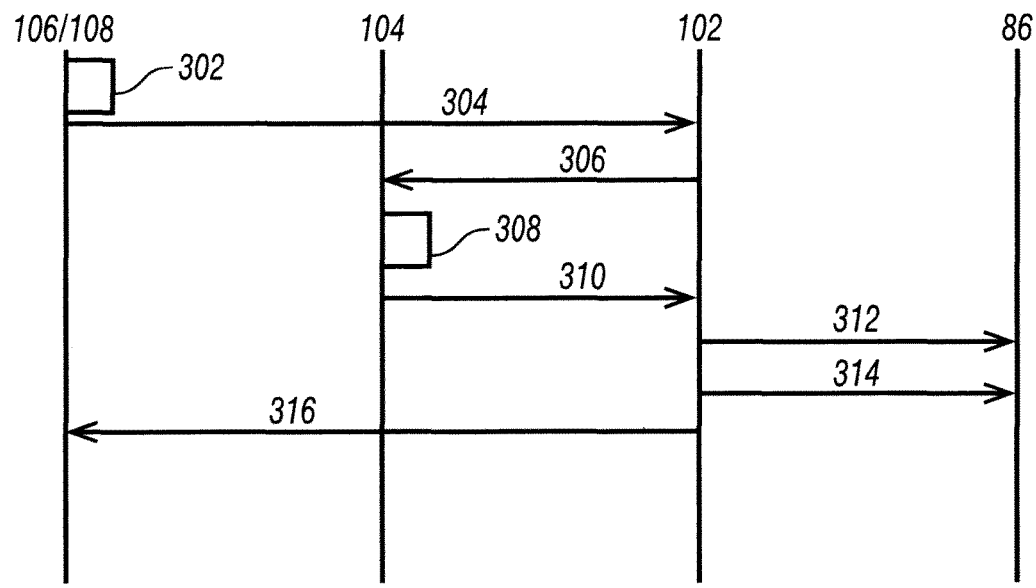
FIG. 5 directs at transmitting of an activation signal from the surface control unit while FIG. 6 directs at transmitting a stopping signal from the surface control unit.

As shown on FIG. 5, the user may trigger 302 the start of the neutron tool 94 by using the triggering panel. A message is then sent 304 to the surface transceiver 102.

When receiving the triggering signal from the user, the surface transceiver 102 requests 306 from the detection device a status from the safety devices. The detection device 104 then determines 308 if the safety devices 50, 52 are in a safe state and sends 310 its response to the surface transceiver 102. If each of the safety devices is in the safe state, a first activating command is sent 312 by the first transmitter 103A to the control module 86. A second activating command 314 is sent a few seconds later. A message is displayed to the user interface, acknowledging that the activating commands have been sent.

If one of these safety devices is not in a safe state, nothing is sent downhole upon reception of the response 310. A message may be displayed on the user interface, reporting to the user that no command has been sent downhole.

The transceiver module 200 receives the first activating commands and transmits a first actuating signal to the microcontrollers 202A, 202B. Each microcontroller 202A, 202B then decodes the first actuating signals and separately transmits it to the logic gate 213 of the circuit 204. The circuit then toggles to a "Temporary State". The "Temporary State" of the circuit 204 may be reached if both the microcontrollers transmit the first activating signal and if the logic circuit 204 was in the "Stand By State" beforehand.

The transceiver module 200 receives the second activating commands and transmits a second actuating signal to the microcontrollers 202A, 202B. Each microcontroller 202A, 202B then decodes the second actuating signal and separately transmits it to the logic gate 212 of the circuit 204. The circuit then toggles to a "Ready State". The "Ready State" of the circuit 204 may be reached if both the microcontrollers transmit the first activating signal and if the logic circuit 204 was in the "Temporary State" beforehand.

The synchronization unit 218 monitors the "Temporary State". When the circuit does not move from the "Temporary State" to the "Ready State" after a predetermined time, such as 1 minute, the circuit 204 toggles from the "Temporary State" to the "Stand-By State". The logic circuit also communicates with the surface control unit 38 via the transceiver module 200 to inform the user at the surface that the activating command has not been received by the control unit.

When the circuit is in the "Ready State", the logic gate 212 produces an actuating control signal to the control modules 261 and 262. Control modules 262 switches the converter 259B on so that power can reach the input 264C of the neutron tool 94. Control module 261 switches the switch 260 on so that power can reach the input 264A of the neutron tool 94.

Of course, the power can reach the power generator and the neutron tool if the mechanical switches 236, 238 are closed. Synchronization unit 218 also continues to monitor the microcontrollers 202A, 202B, 211 and may command the opening of the fuse 230 if it does not receive a pulse from each of the microcontrollers during the predetermined period disclosed above. In this case, the circuit 204 also toggles to the "Error State".

Sensors 222, 224A, 224B, 224C, 226 then measure the voltages and intensities on the respective lines. Module 220 compares these parameters to a respective threshold value. If one of these parameter is not in a predetermined range, module 220 sends a blocking signal to the blocking control module 234 so that the fuse opens. The circuit then toggles to the "Error State".

When the neutron tool is operating, a message is sent to the control surface unit 38 to acknowledge that the neutron generator is operating via the microcontroller 202A, and the transceiver unit 200. Data acquired by the neutron tool is also sent uphole.

During the operation of the neutron tools, if one of the sensors 222, 224A, 224B, 224C, 226 detects a voltage or intensity which is not in conformity with the selected voltage or intensity range, or that the synchronization unit 218 does not receive a pulse from the neutron tool microcontroller during the predetermined period, the state detection unit 220 or the synchronization unit 218 sends a blocking control signal to the blocking control unit 234 so that it closes the switches 232, so as to open the fuse 230. The logic circuit 230 also toggles in "Error State".

Once the surface control unit 38 has sent the second activating command, it is configured to send periodically a confirmation command. This confirmation command is received downhole by the transceiver unit 200 and then transmitted to both microcontrollers 202A, 202B which detects and decodes it. Each of the microcontroller 202A, 202B transmits to the logic circuit, for instance to the circuit gate 212, respective confirmation signals. The confirmation signals can be the same as the second activating signals. A confirmation control signal is then transmitted by the logic gate 212 to the control modules 261, 262.

The synchronization module 218 of the logic circuit checks when the last signal has been sent by the logic gate 212 and compares the measured duration to a duration threshold value. If the measured duration is greater than the threshold value, it means that the commands are not received anymore from the surface. The synchronization module 218 then sends a blocking signal to the blocking control module 234 so that it opens the fuse 230 and disables the tool 94. The logic circuit toggles to the "Error State".

Figure 6:
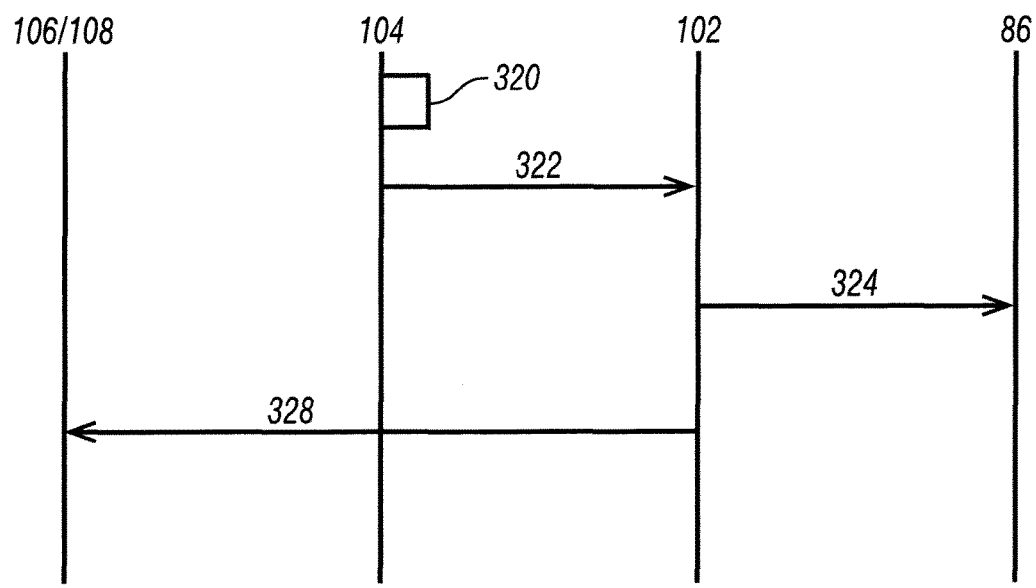

Further, as shown on FIG. 6, if the detection device detect 320 that the safety device 50, 52 suddenly reaches an unsafe state, it notifies 322 the surface transceiver 102 and in particular the second transmitter 103B of the surface control unit 38 transmits 324 a stopping command to the downhole transceiver unit 200. A message is also sent 328 and displayed on the user interface 106. Upon reception of the stopping command, the downhole transceiver unit 200 transmits a blocking signal to each of the microcontroller which detects and decodes it and each transmits this blocking signal to the logic gate 216. If the logic gate 216 receives a blocking signal from one of the microcontrollers 202A, 202B, it transmits a blocking control signal to the control module 234 for opening the fuse 230. The circuit 204 also toggles to an "Error" state.

When the user is willing to stop the neutron tool 94, he sends a termination command thanks to the transmitting device 103 of the surface control unit. The termination command has been triggered by an action of the user on the triggering panel. This command is received by the transceiver unit 200 downhole which transmits a termination signal to each microcontrollers 202A, 202B. These microcontrollers each decode the termination signal and send it to the logic gate 217. Upon reception of the terminating signal sent by one of the microcontroller, the logic gate transmits a terminating signal to the control modules 261, 262, 234, 256 so they are restored to their initial state (fuse 230 closed and switch 232, 254, 260 open and converter 259B it its inactive state). The logic circuit also toggles to its initial state ("Off state"). A message may be sent to the user through the transceiver unit 200 and the surface control unit 38 for indicating that the neutron tool 94 has been turned off.

When the circuit is in "Error" state, it cannot toggle to the "Stand By" state. It has to toggle to its "Off" State before. The user may send a termination command so that the tool can reach the "Off" state and may work again afterwards.

Figure 7A:
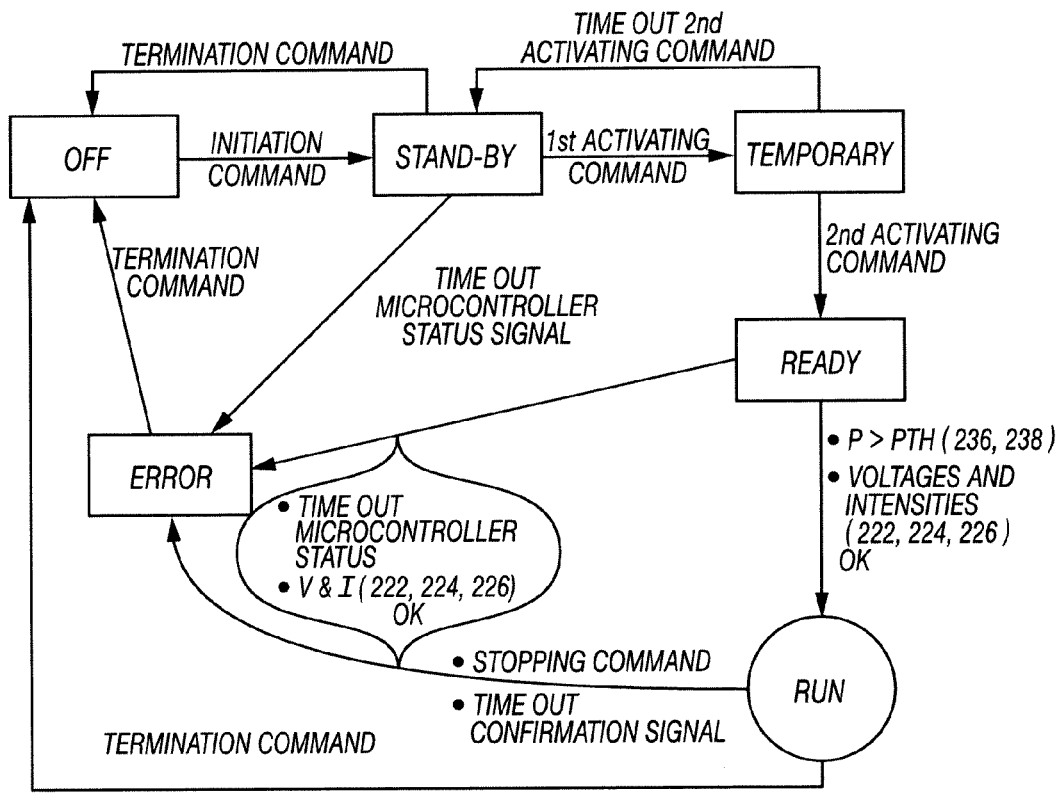
FIG. 7A is a general state diagram of a method of intervention according to one embodiment of the disclosure.

In fact, as shown on FIG. 7 An the installation according to the disclosure may be operated so that:

after reception of an initiation command, the logic circuit of the control module reaches a "stand by" state, from this "Stand by" state, if the control module does not receive periodically a status signal from the microcontrollers, the logic circuit of the control module reaches an "Error" state, from this "Stand By" state, if the control module receive a first activating command, the logic circuit of the control module reaches a "Temporary State"

from this "Stand By" state, if the control module receive a "termination command", the logic circuit of control module reaches a "Off" state.

from this "Temporary" state, if the control module receives a second activating command during a predetermined period, the logic circuit of control module reaches a "Ready State", from this "Temporary" state, if the control module does not receive a second activating command during a predetermined period, the logic circuit of control module reaches a "Ready State", from this "Ready" state, the tool can be run if the pressure is above a certain threshold, voltages and intensities measured downhole are above predetermined thresholds, from this "Ready" state, the control module reaches an "Error" State if voltages and intensities measured downhole are not above predetermined thresholds, or if the control module does not receive periodically a status signal from the microcontrollers;

when the tool is run, the logic circuit of control module reaches an "Error" State if voltages and intensities measured downhole are not above predetermined thresholds, or if the control module does not receive periodically a status signal from the microcontrollers, and also if it received a stopping command from the surface or if it does not receive periodically a confirmation command from the surface, when the tool is run, if the control module receive a termination command, the logic circuit of control module reaches a "Off" state, from the "Error" state, if the control module receive a termination command, the logic circuit of control module reaches a "Off" state.

Figure 7B:
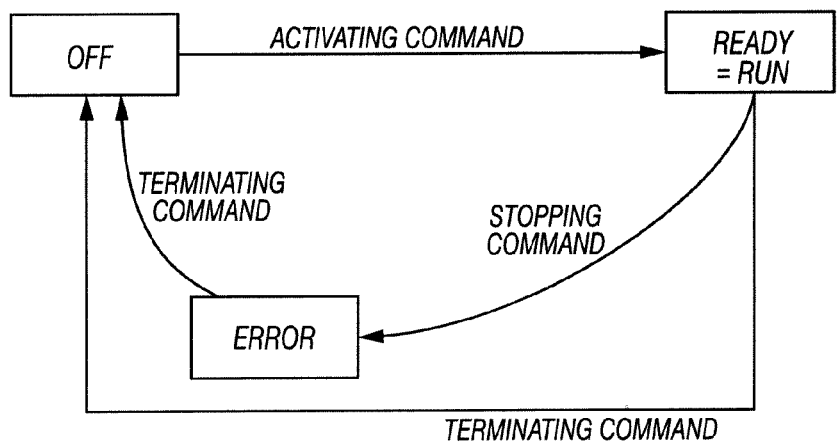
FIG. 7B is a general state diagram of a method of intervention according to another embodiment of the disclosure.

In another embodiment, shown on FIG. 7B, from a "Off" State, the tool reaches a "Ready state" upon reception of an activating command received from the surface control module. In this "Ready State", the tool can be run without any other conditions being monitored. From the "Ready State" it may reach an "Error" state if a stopping command is transmitted from the surface. From the "Ready" or "Error" State, it may reach the "Off" State when a termination command is sent from the surface. The downhole tool and control module 86 is accordingly modified to operate such a process.

In view of the entirety of the present disclosure, including the figures, a person skilled in the art should appreciate that they may readily use the present disclosure as a basis for designing or modifying other processes and structures for carrying out the same uses and/or achieving the same aspects introduced herein. A person skilled in the art should also realize that such equivalent constructions do not depart from the spirit and scope of the present disclosure, and that they may make various changes, substitutions and alterations herein without departing from the spirit and scope of the present disclosure. For example, although the preceding description has been described herein with reference to particular means, materials and embodiments, it is not intended to be limited to the particulars disclosed herein; rather, it extends to functionally equivalent structures, methods, and uses, such as are within the scope of the appended claims.

For instance, downhole, the lower assembly may comprise other types of tools that the one described besides the neutron tool or no other one. The neutron tool 94 could be powered by one voltage, microcontrollers 202A, 202B could be replaced by one microcontroller, switches 236, 238, fuse 230 may be optional, as switch 254. The synchronization unit 218 or the state detection unit 220 may not trigger any blocking control signal. For instance, uphole, there may be one safety devices or more than two. The safety devices may not be of the type that has been described here. Safety devices may be added or removed. A timer may be used as a safety device.

The triggering panel, user interface and even safety device may also be a unique unit. The surface control unit may not send a surface confirmation signal. The user may not trigger the operation of the neutron tool. Conveying device may also comprise other devices that the ones that have been described here. For instance, the communication module is an optical fiber carried by a coiled tubing.

The invention claimed is:

1. An installation for intervention in a well, comprising:
a lower assembly intended to be lowered in a well comprising a neutron generator and a power source electrically connected to the neutron generator;
a surface assembly comprising one or more safety devices, each safety device being either in a safe state or an unsafe state;
a communication module that connects the lower assembly and surface assembly;
wherein the surface assembly comprises a surface transmitting device for transmitting data to the lower assembly via the communication module including:
a first transmitter for transmitting an activating command, configured to transmit the activating command only if each of the safety device is in a safe state, and
a second transmitter for transmitting a stopping command, configured to transmit the stopping command if one of the safety device is in an unsafe state,
wherein the surface assembly comprises at least a detection device, each associated with at least one of the safety devices and configured to determine whether said safety devices are in a safe state, wherein the or at least one of the safety devices comprises a measuring device of a parameter relative to the lower assembly, the associated detection device being configured to compare a measured value of the parameter to a predetermined threshold value, wherein the parameter is a depth of the lower assembly.

2. The installation according to claim 1, wherein the or at least one of the safety devices further comprises an identification device for identifying an authorized user, the associated detection device being an authentication device of the identification device.

3. The installation according to claim 1, wherein the installation comprises a trigger interface for generating a triggering signal by the user, wherein the first transmitter is configured to transmit the activating command only if the triggering signal has been generated.

4. The installation according to claim 1, wherein the lower assembly comprises a downhole transmitter for transmitting data relative to the lower assembly to the surface via the communication module.

5. The installation according to claim 1, wherein the lower assembly comprises an operating assembly including the neutron generator and the power source and a control module configured to operably command at least one component of the operating assembly, wherein the control module comprises:
an actuating transmitter for sending an actuating signal to the or at least one of the components, configured to send the actuating signal only if the activating command has been received, and/or
a blocking transmitter for sending a blocking signal to the or at least one of the components upon reception of the stopping command.

6. The installation according to claim 5, wherein:
the surface transmitting device is configured to transmit periodically a surface confirmation command to the control module after an activating command has been transmitted,
the control module comprises a timer for measuring the duration since the former surface confirmation signal and/or the activating command has been received and for comparing the duration with a threshold duration, the blocking transmitter being configured to send the blocking signal if the compared duration is above the threshold.

7. The installation according to claim 1, wherein the communication module is configured to provide real-time communication between the surface assembly and the lower assembly.

8. The installation according to claim 7, comprising a conveyance device for conveying the lower assembly wherein the conveyance device carry the communication module, which is electrically or optically connected to the lower assembly and to the surface assembly.

9. The installation according to claim 8, wherein the conveyance device comprise an electrically conductive conveying cable, the cable also being electrically connected to the lower assembly and to the surface assembly so as to be part of the communication module.

10. The installation according to claim 9, wherein the conveyance device comprise a conveying tube attached to an optical fiber optically connected to the lower assembly and to the surface assembly and being part of the communication module.

11. Method for intervention in a well, comprising:
using a lower assembly intended to be lowered into a well and including a neutron generator and a power source electrically connected to the neutron generator,
measuring with a safety device of a surface assembly a parameter relative to the lower assembly, wherein at least one of the parameters is a depth of the lower assembly,
detecting a state of the safety device, the safety device being either in a safe state or in a unsafe state, wherein detecting that the safety device is in a safe state comprises comparing a measured value of the parameter to a predetermined threshold value,
transmitting to the lower assembly an activating command only if the safety device is in a safe state, and
transmitting to the lower assembly a stopping command, if the safety device is in an unsafe state.

12. The method according to claim 11, comprising:
operating the neutron generator only if the activating command has been received by the lower assembly, and
stopping the operation of the neutron generator upon reception of the stopping command by the lower assembly.

13. The method according to claim 11, wherein the safety device is a first safety device, further comprising detecting the state of at least a second safety device, wherein the method includes:
transmitting to the lower assembly an activating command only if each of the safety device is in a safe state, and
transmitting to the lower assembly a stopping command, if one of the safety device is in an unsafe state.

14. The method according to claim 13, wherein the second safety device is an identification device for identifying an authorized user, and detecting the state of the second safety device includes authenticating the identification device.

* * * * *